US012798068B2

(12) United States Patent
Arthur et al.

(10) Patent No.: US 12,798,068 B2
(45) Date of Patent: Nov. 17, 2026

(54) PNEUMATICALLY OPERATED PERCUSSIVE TOOL

(71) Applicant: G.A.W. Inc., Romulus, MI (US)

(72) Inventors: Robert Arthur, Flat Rock, MI (US); Nathaniel P. Wenzel, Cape Coral, FL (US); Richard Stillings, Jr., Trenton, MI (US)

(73) Assignee: G.A.W. Inc., Romulus, MI (US)

( * ) Notice: Subject to any disclaimer, the term of this patent is extended or adjusted under 35 U.S.C. 154(b) by 0 days.

(21) Appl. No.: 18/970,018

(22) Filed: Dec. 5, 2024

(65) Prior Publication Data

US 2025/0214217 A1 Jul. 3, 2025

Related U.S. Application Data

(60) Provisional application No. 63/615,830, filed on Dec. 29, 2023.

(51) Int. Cl.

| | |
|---|---|
| ***B25D 9/00*** | (2006.01) |
| ***B25D 9/04*** | (2006.01) |
| ***B25D 9/18*** | (2006.01) |

(52) U.S. Cl.

CPC ................. *B25D 9/04* (2013.01); *B25D 9/18* (2013.01); *B25D 2217/0023* (2013.01); *B25D 2250/181* (2013.01)

(58) Field of Classification Search

CPC . B25D 17/24; B25D 9/04; B25D 9/18; B25D 2217/0023; B25D 2250/181

USPC ............................................... 173/162.2, 114

See application file for complete search history.

(56) References Cited

U.S. PATENT DOCUMENTS

2010/0139940 A1 * 6/2010 Kobayashi ............... B25D 9/18 173/162.2

* cited by examiner

*Primary Examiner* — Jacob A Smith

(74) *Attorney, Agent, or Firm* — Brooks Kushman P.C.

(57) ABSTRACT

An improved pneumatically operated percussive tool and implement with a host of innovative design features that provide improved performance, drastically reduced weight, and speed of implement attachment and removal.

20 Claims, 5 Drawing Sheets

PNEUMATICALLY OPERATED PERCUSSIVE TOOL

CROSS-REFERENCE TO RELATED APPLICATIONS

This application claims the benefit of U.S. provisional application Ser. No. 63/615,830 filed Dec. 29, 2023, the disclosure of which is hereby incorporated in its entirety by reference herein.

TECHNICAL FIELD

This invention relates to a pneumatically operated percussive tool that repeatedly impacts a workpiece with a removable implement such as a chisel, and more particularly to a tool having innovative features that contribute to lower weight and improved performance.

BACKGROUND

Pneumatically operated percussive tools (i.e., air tools) such as chisel hammers or rivet busters are commonly used in industrial and construction work. In a typical application, the operator manipulates the tool so that the tip of the chisel (or other implement) is placed in contact with the workpiece (such as a section of concrete or the flattened head of a rivet), and activates a trigger of the tool so that tip of the chisel percussively impacts the workpiece. Usually, the operator must bear some or all the weight of the tool during its use and movement, leading to operator fatigue. Accordingly, it is desired to reduce the tool weight without impairing its durability or its impact energy, and also to improve its ease of use.

SUMMARY

The present invention is directed to an improved pneumatically operated percussive tool and implement with a host of innovative design features that provide improved performance, drastically reduced weight, and speed of implement attachment and removal.

A percussion tool includes a barrel, a chisel, a piston, a handle, and a valve. The barrel has a proximal region, has a distal region, and defines a bore extending from the proximal region to the distal region. The chisel is at least partially disposed within the bore along the proximal region. The piston is disposed within the bore is and operable to move within the bore between the proximal region and the distal region. The handle is secured to the barrel along the proximal region, defines a cavity positioned adjacent to an end of the bore, and defines at least one channel operable to supply pressurized air to the cavity. The valve is disposed within the cavity. The valve has a first manifold, a second manifold, and an armature. The first manifold is operable to establish fluid communication between the cavity and the bore along the proximal region to drive the piston toward the distal region for engagement with the chisel. The second manifold is operable to establish fluid communication between the cavity and the bore along the distal region to drive the piston toward the proximal region and away from the chisel. The armature is disposed between the first and second manifolds. The armature is operable to engage the first manifold to restrict fluid communication between the cavity and the bore along the proximal region. The armature is further operable to disengage the first manifold to facilitate fluid communication between the cavity and the bore along the proximal region. The armature is further operable to engage the second manifold to restrict fluid communication between the cavity and the bore along the distal region. The armature is further operable to disengage the second manifold to facilitate fluid communication between the cavity and the bore along the distal region.

A tool includes a housing, a tool bit, a piston, a handle, and a valve. The housing defines a first cavity. The tool bit is disposed along an end of the first cavity. The piston is disposed within the first cavity and is operable to engage the tool bit. The handle is secured to the housing and defines a second cavity that is operable to receive pressurized fluid. The valve is disposed within the second cavity. The valve has a valve chest, a valve block, and an armature. The valve chest is operable to deliver pressured fluid from the second cavity to the first cavity to drive the piston toward engagement with the tool bit. The valve block is operable to deliver pressurized fluid from the second cavity to the first cavity to drive the piston away from engagement with the tool bit. The armature is operable to engage the valve chest and disengage the valve block to restrict fluid flow through the valve chest and facilitate fluid flow through the valve block. The armature is further operable to and engage the valve block and disengage the valve chest to restrict fluid flow through the valve block and facilitate fluid flow through the valve chest.

An air tool that utilizes pressurized air to impart a percussive movement to a chisel retained in one end of a barrel of the tool includes a handle assembly and a retainer assembly. The handle assembly is mounted on an inboard end of the barrel. The retainer assembly is mounted on an outboard end of the barrel. The handle assembly includes a throttle valve assembly oriented perpendicular to the barrel. The handle assembly further includes a control valve assembly disposed in a circular cavity that opens into the inboard end of the barrel.

DETAILED DESCRIPTION

Figure 1A:
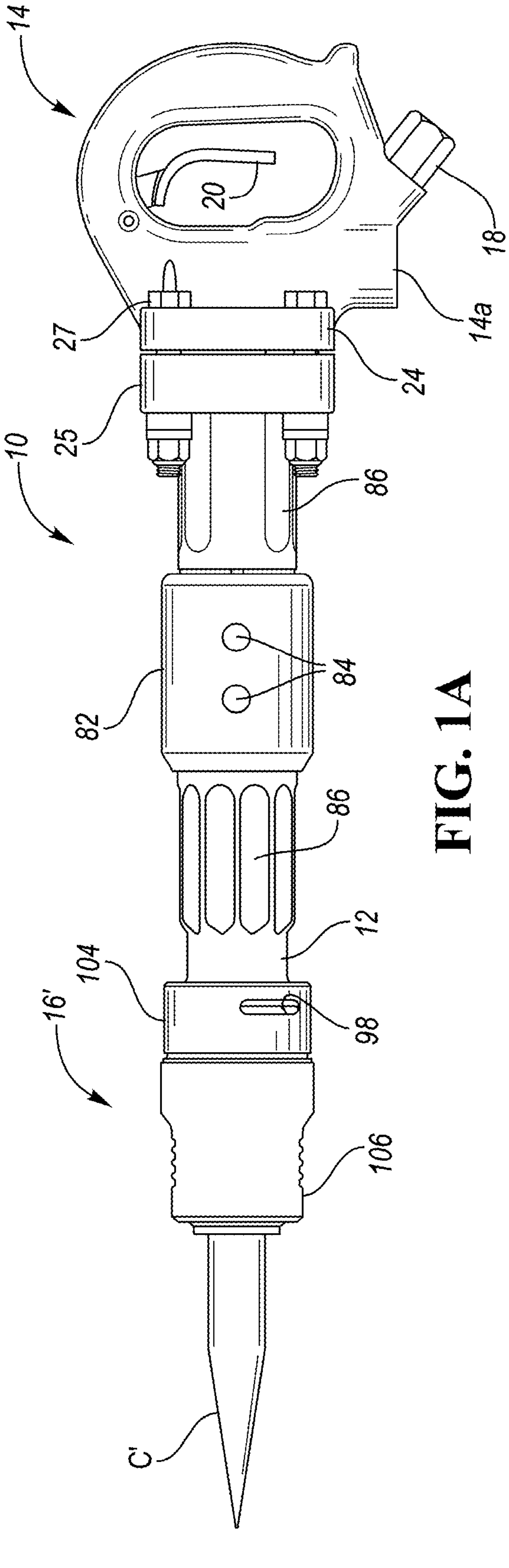
FIGS. 1A-1B are side and top elevation views, respectively, of an air tool according to this invention, and equipped with a quick-release retainer assembly according to this invention.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The inventive features described herein and shown in the drawings are disclosed in the context of an air tool 10 commonly referred to as a chisel hammer or rivet buster. While many of the described features will be applicable to other types of air tools, the advantages will be most keenly appreciated by the users of heavy duty air tools like rivet busters or the like because these are typically among the largest and heaviest of air tools.

Figure 1B:
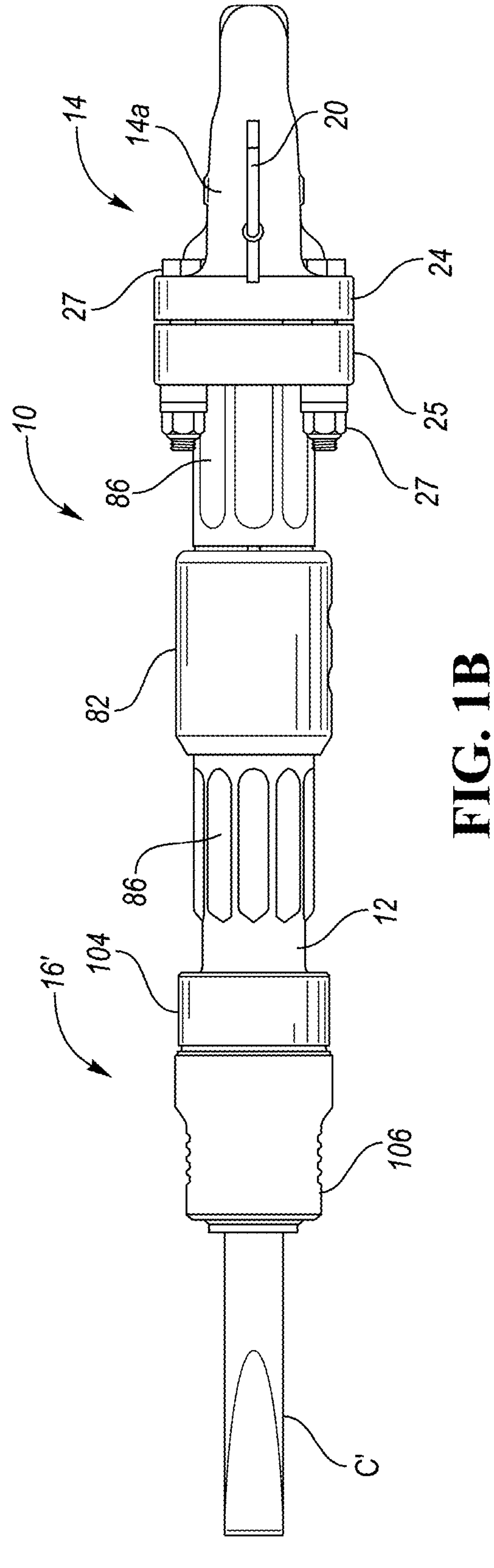
Figure 2A:
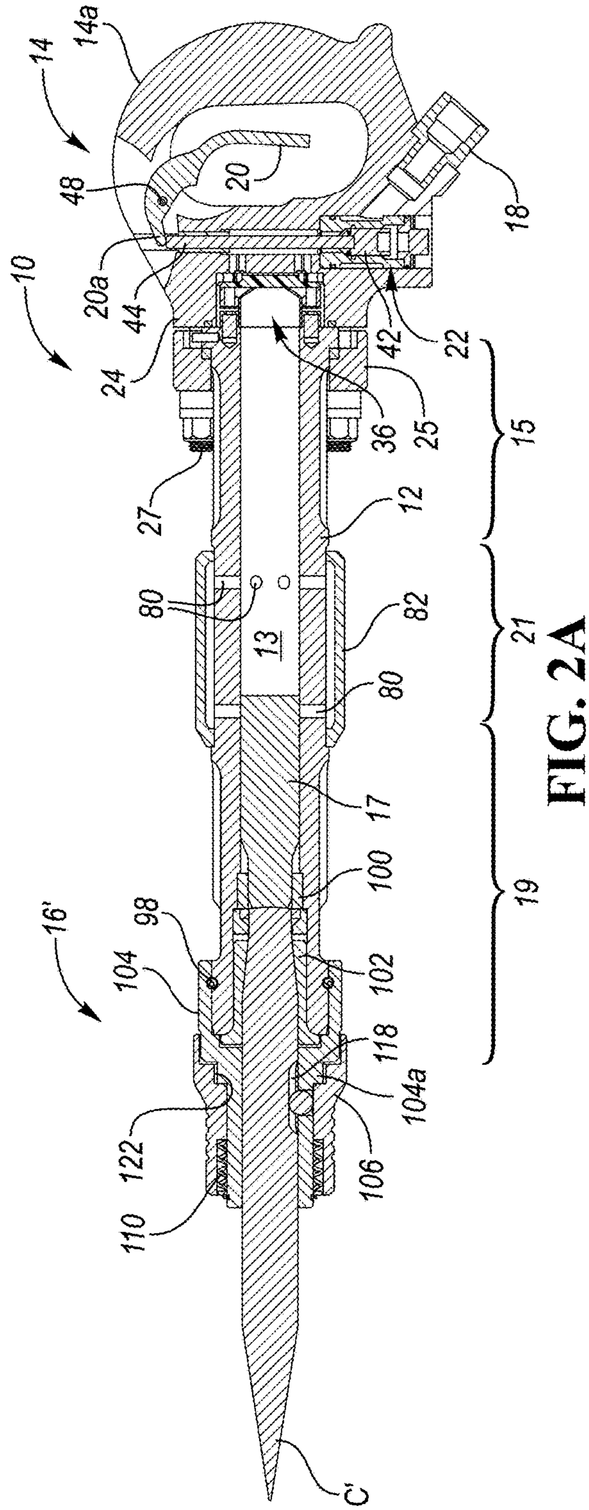
FIGS. 2A-2B are axial cross-sectional views of the elevation views of FIGS. 1A-1B, respectively.
Figure 2B:
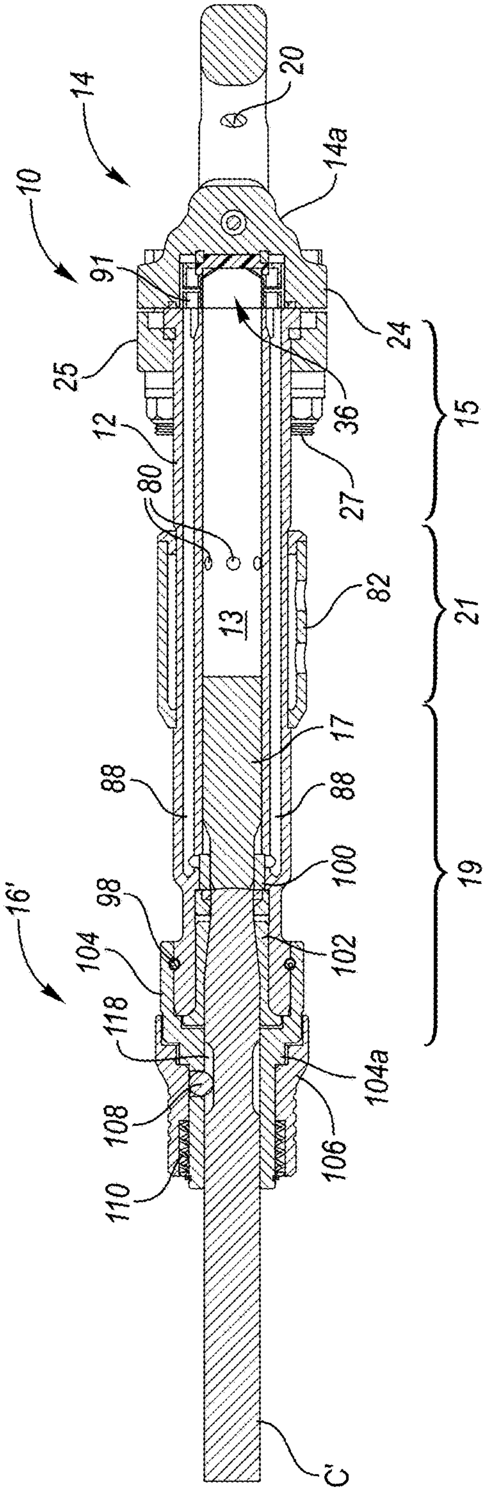
Figure 3:
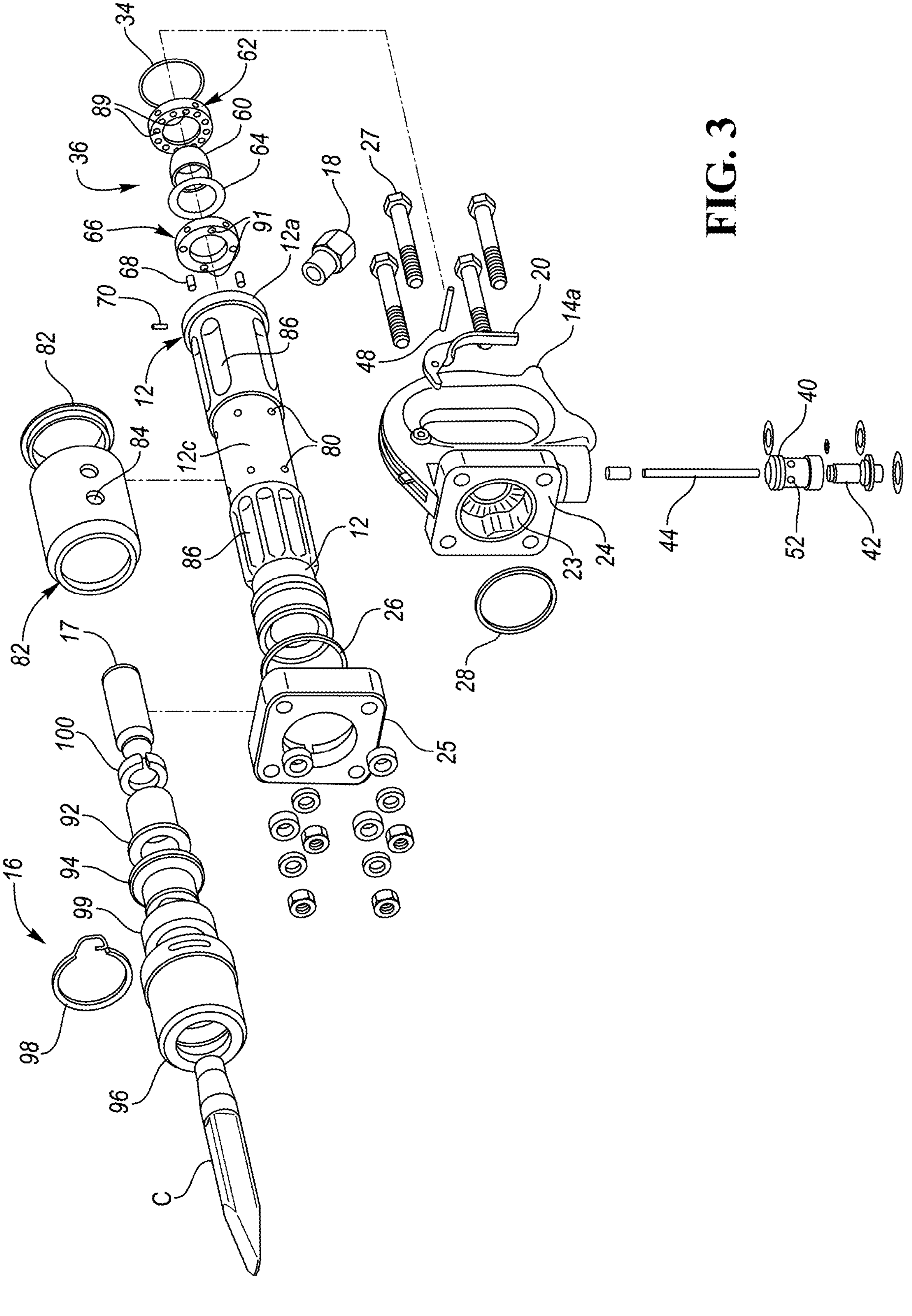
FIG. 3 is an exploded view of an air tool according to this invention, and equipped with a conventional retainer assembly.

In general, and referring to FIGS. 1-3, the air tool 10 has a housing or a tubular barrel 12 fitted with a handle assembly 14 at its inboard or upper axial end and a retainer assembly 16/16' at its outboard or lower axial end. A chisel C/C' or other implement (e.g., hammer, punch, or other tool bit) is fitted within the barrel 12, and a piston 17 disposed within the barrel 12 percussively impacts the inboard or upper end of the chisel C/C' when the air tool 10 is activated by an operator. The un-primed reference characters 16 and C reference a conventional retainer assembly and chisel such as depicted in the exploded view of FIG. 3, whereas the primed reference characters 16' and C' reference a new and novel quick release retainer assembly and chisel as depicted in FIGS. 1A-1B, 2A-2B and 5.

The barrel 12 defines an internal cavity or bore 13. The barrel 12 has a proximal region 15, a distal region 19, and a central region 21. The bore 13 extends from the proximal region 15 to the distal region 19. The chisel C/C' or other implement is at least partially disposed within bore 13 along the distal region 19 and/or along an end of the bore 13. The piston 17 is also disposed within the bore 13 and is operable to move within the bore 13 between the proximal region 15 and the distal region 19 to engage and disengage the chisel C/C' or other implement.

The handle assembly 14, which may take various other shapes (D-shaped, or T-shaped, for example), includes a handle body 14*a*, an air inlet port 18 adapted to be coupled to a source of compressed air by an air hose (not shown), a spring-biased trigger 20, and a throttle valve assembly 22 activated by the trigger 20 to direct compressed air from the air inlet port 18 to a circular cavity 23 in the barrel mounting flange 24 of handle body 14*a*. The handle body 14*a* is preferably formed of aluminum for reduced weight compared to the usual cast iron handles used rivet busters, and is fastened to the inboard end of the barrel 12 with a mounting block 25, also preferably formed of aluminum. The handle assembly 14 may be secured to the to the barrel 12 along the proximal region 15. The inboard end of barrel 12 has an integral flange 12*a* engaged by a sealing ring 26 captured in the inboard face of mounting block 25, and a set of four bolts 27 pass through the mounting block 25 and the mounting flange 24 of handle body 14*a* to fasten the handle body 14*a* to the barrel 12. An O-ring 28 seated in an annular recess 30 in the inboard face of mounting flange 24 is compressed between the mounting flange 24 and the barrel flange 12*a* to seal the interface between the barrel 12 and the handle assembly 14. The circular cavity 23 of handle body 14*a* is axially aligned with and may be adjacent to the bore 13 of barrel 12, and accommodates a disk-shaped cushion element 34 and a control valve assembly, generally designated by the reference numeral 36. Housing both the throttle valve assembly 22 and the control valve assembly 36 within the aluminum handle body 14*a* results in a barrel/handle assembly that is more compact and lightweight than has previously been achieved in heavy-duty air tools of this type.

Figure 4:
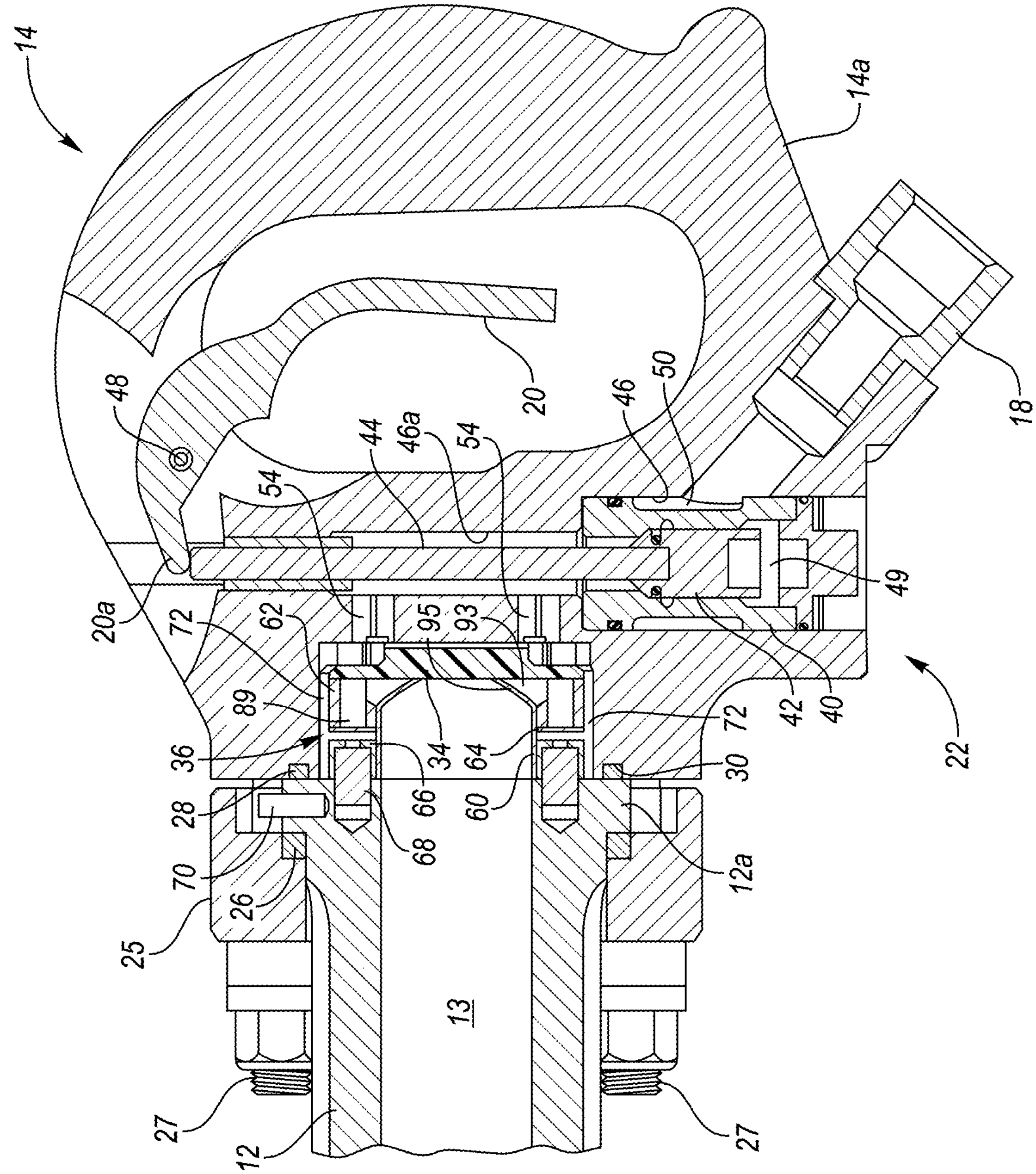
FIG. 4 is an enlarged view of the handle portion of the air tool depicted in FIG. 2A.
Figure 5:
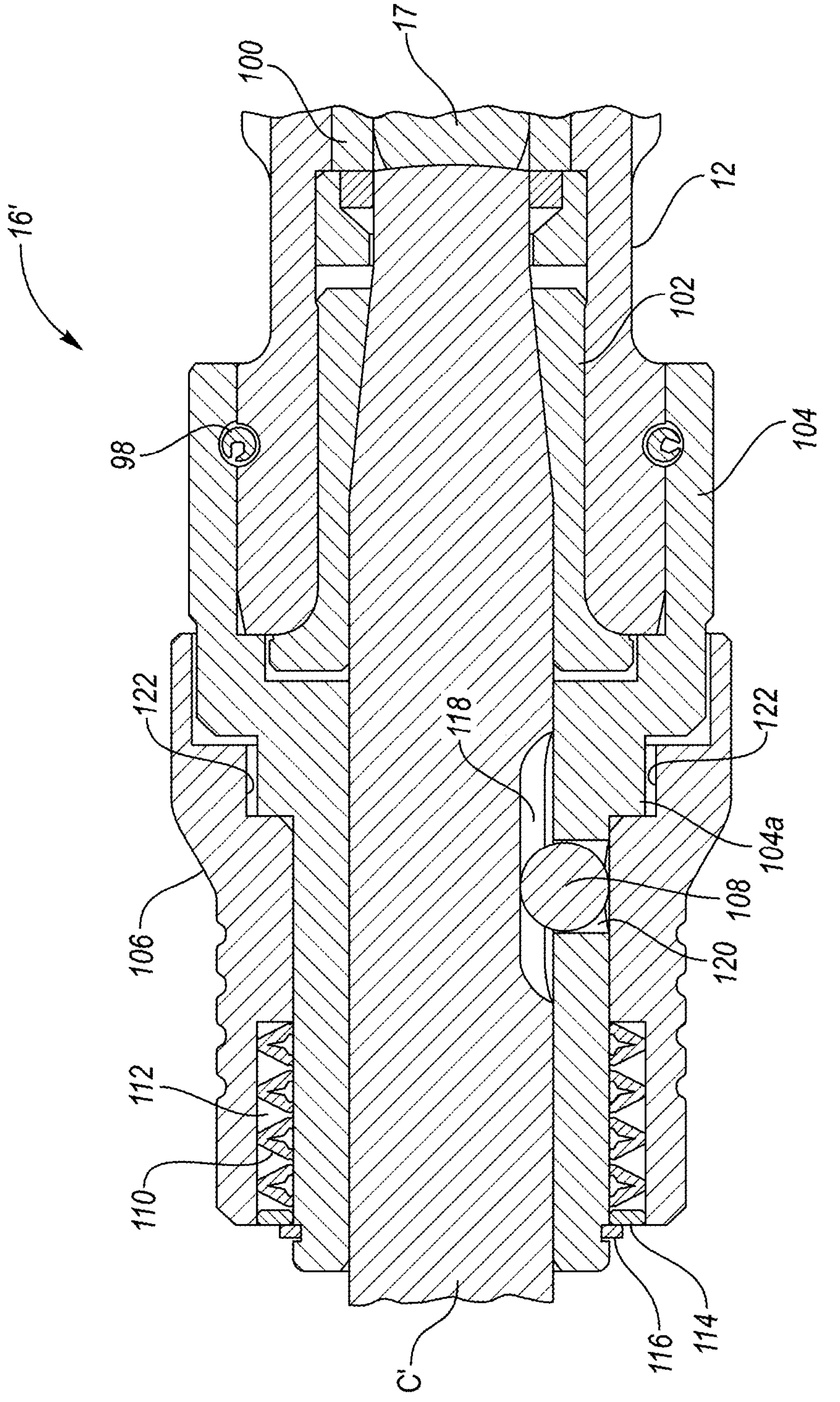
FIG. 5 is an enlarged view of the retainer assembly portion of the air tool depicted in FIG. 2A.

The throttle valve assembly 22 comprises a valve body 40, an armature 42 disposed within the valve body 40 for axial movement therein, and a valve stem 44 extending between the armature 42 and the inboard end 20*a* of trigger 20. The components of the throttle valve assembly 22 are disposed within a vertical bore 46 of handle body 14*a*, which is to say, perpendicular to the barrel 12 of the assembled air tool 10, and axially inboard of the circular cavity 23 that houses the control valve assembly 36. The trigger 20 is essentially a lever arm that pivots about a pin 48 seated in the handle body 14*a*, such that its inboard end 20*a* contacts the upper end of valve stem 44. The pressurized air at air inlet port 18 is bled to a cavity 49 in the bottom of the valve body 40 (as best seen in FIG. 4) to bias the armature 42 upward as depicted in FIG. 4, and into engagement with a seat formed in the valve body 40. The pressurized air at air inlet port 18 is directly and primarily supplied to an annular cavity 50 between the vertical bore 46 and the valve body 40, and the valve body 40 is provided with a set of lateral openings 52 (as seen in the exploded view of FIG. 3) so that when the operator squeezes the trigger 20 and its inboard end 20*a* pushes the valve stem 44 downward, the armature 42 also moves downward to direct pressurized air in the annular cavity 50 into the portion 46*a* of the vertical bore 46 surrounding the valve stem 44. When the operator releases the trigger 20, the pressure in the bottom cavity 49 biases the armature 42 upward to isolate the vertical bore portion 46*a* from the annular cavity 50. The vertical bore portion 46*a*, in turn, is coupled to the circular cavity 23 of handle body 14*a* through a set of axial openings 54 (best seen in FIG. 4). Consequently, activation of the trigger 20 by the operator serves to supply pressurized air to the circular cavity 23 in which the components of control valve assembly 36 are disposed. Stated in other terms, at least one channel defined by the handle assembly 14 (e.g., vertical bore 46 and axial openings 54) is operable to supply pressurized air to the circular cavity 23.

The components of control valve assembly 36 (e.g., valve chest 62, disk-armature 64 and valve block 66) are annular in shape, and are disposed annularly around a cup-shaped valve case 60 that is disposed and/or inserted into the circular cavity 23 of handle body 14*a* prior to fastening the barrel 12 to the handle 14. It is noted that the components of control valve assembly 36 (e.g., valve chest 62, disk-armature 64 and valve block 66) are also disposed within the circular cavity 23. As best seen in FIG. 4, the diameter of the valve case 60 is slightly larger than the inside diameter of barrel 12 so that the barrel 12 retains the valve case 60 within the cavity 23. As best seen in the exploded view of FIG. 3, the control valve assembly 36 includes a valve chest 62, a disk-armature 64 and a valve block 66, with the disk-armature 64 disposed between the valve chest 62 and valve block 66. The valve chest 62 and the valve block 66 may be referred to as first and second manifolds, respectively, or vice versa. The valve block 66 is rotationally keyed to the barrel 12 by a set of valve dowels 68 to align air passages between the two, and a pin 70 rotationally aligns the barrel 12 to the handle body 14*a*. When the barrel 12, handle 14 and control valve assembly 36 are assembled, the space between the control valve components 62-66 and the periphery of the circular cavity 23 defines an annular cavity 72 that communicates with the axial openings 54 of handle body 14*a* so that the air pressure supplied to air inlet port 18 is present in the annular cavity 72 when the operator squeezes the trigger 20 to activate the throttle valve assembly 22.

The tubular barrel 12 is formed of hardened steel. The inboard or upper end incorporates a flange 12*a* for attachment to the handle body 14*a* as described above, and the outboard or lower end is flared to accept a chisel or other implement C/C' and a retainer assembly 16/16'. A central portion 12*c* of the barrel 12 has an array of drilled openings 80 that permit pressurized air in the barrel 12 to periodically exhaust from the inner periphery of barrel 12 as the piston 17 moves back and forth within the barrel 12. An exhaust deflector 82 fitted over the central portion 12*c* collects the air exhausted through the drilled openings 80, and exhausts it to the atmosphere through a set of exhaust ports 84. On either side of the central portion 12*c*, the exterior periphery of the barrel 12 is scalloped or fluted as indicated by the reference numerals 86 to remove unnecessary material and thereby reduce the barrel weight.

The control valve assembly 36 achieves the same functionality of a conventional air tool control valve, but in a more compact space. This is due, in part, to the use of a relatively thin disk-armature 64 that slides axially on the valve case 60 between the valve chest 62 and the valve block 66. When the trigger 20 is squeezed to activate the throttle valve assembly 22, and the piston 17 is in the rearward position adjacent the handle 14, air pressure in annular cavity 72 acts on the upper or inboard face of the disk-armature 64 to drive it forward against the valve block 66; this opens the valve chest 62 to pressurize the bore 13 of barrel 12 inboard of the piston 17, driving the piston 17 forward to impact the inboard end of the chisel C/C'. When the piston 17 is forwardly displaced in this manner, the pressurized air in the barrel 12 inboard of the piston 17 escapes through the drilled openings 80 and exhaust ports 84, and the disk-armature 64 moves rearward against the valve chest 62; this directs the air pressure in annular cavity 72 forward through the barrel passages 88 to the bore 13 of barrel 12 outboard of the piston 17 to drive the piston 17 rearward toward the handle 14. The barrel passages 88 may comprise at least one channel that is disposed radially outward form the bore 13. At the end of its travel, the piston strikes the cushion element 34 in the circular cavity 23 of handle body 14*a*, which compresses to isolate the kinetic energy of the piston 17 from the handle 14. At this point, the air pressure in annular cavity 72 acts on the upper or inboard face of the disk-armature 64 to drive it forward against the valve block 66, as described above, and the piston 17 is again driven forward to create a cyclic or percussive striking of the chisel C/C'.

The functionality of the control valve assembly 36 may also be described in the following alternative manner. The valve chest 62 is operable to establish fluid communication between the circular cavity 23 and the bore 13 along the proximal region 15 to deliver pressurized fluid (e.g., pressurized air) from the circular cavity 23 and the bore 13 along the proximal region 15, and to drive the piston 17 toward the distal region 19 for and toward engagement with the chisel C/C' or other implement. The valve block 66 is operable to establish fluid communication between the circular cavity 23 and the bore 13 along the distal region 19 to deliver pressurized fluid (e.g., pressurized air) from the circular cavity 23 and the bore 13 along the distal region 19, and to drive the piston 17 toward the proximal region 15 and away from the chisel C/C' or other implement (e.g., away from engagement with the chisel C/C').

The disk-armature 64 is disposed between the valve chest 62 and the valve block 66. The disk-armature 64 is operable to engage the valve chest 62 (which covers and restricts flow through orifices 89 discussed below) to restrict fluid communication between the circular cavity 23 and the bore 13 along the proximal region 15. The disk-armature 64 is further operable to disengage the valve chest 62 to facilitate fluid communication between the circular cavity 23 and the bore 13 along the proximal region 15. The disk-armature 64 is further operable to engage the valve block 66 (which covers and restricts flow through orifices 91 discussed below) to restrict fluid communication between the circular cavity 23 and the bore 13 along the distal region 19. The disk-armature 64 is further operable to disengage the valve block 66 to facilitate fluid communication between the circular cavity 23 and the bore 13 along the distal region 19.

The barrel passages 88 are operable to establish fluid communication between the valve block 66 and the bore 13 along the distal region 19. The drilled openings 80 defined along central region 21 of the barrel 12 are also in fluid communication with the barrel passages 88. The drilled openings 80 are operable to deliver fluid (e.g., pressurized air) from the bore 13 to the control valve assembly 36 via the barrel passages 88 in response to the piston 17 transitioning to the distal region 19 and/or is response to the piston 17 engaging the chisel C/C' in order to transition the disk-armature 64 toward and into engagement with the valve chest 62 and out of engagement with the valve block 66. This in turn results in the fluid (e.g., pressurized air) being delivered from the circular cavity 23 via the valve block 66 to the bore 13 along the distal region 19 to drive the piston 17 back toward the proximal region 15.

The valve chest 62 defines orifices 89. The orifices 89, when not covered by the disk-armature 64, are operable to establish fluid communication between circular cavity 23 and the bore 13 along the proximal region 15 to deliver the fluid (e.g., pressurized air) to the bore 13 along the proximal region 15. The valve block 66 defines orifices 91. The orifices 91, when not covered by the disk-armature 64, are operable to establish fluid communication between the circular cavity 23 and the bore 13 along the distal region 19 via the barrel passages 88 to deliver the fluid (e.g., pressurized air) to the bore 13 along the along the distal region 19.

The orifices 89 of the valve chest 62, when not covered by the disk-armature 64, are operable to deliver the fluid (e.g., pressurized air) to the bore 13 along the proximal region 15 through orifices defined in the valve case 60 or via through a gap defined along a region of contact between the valve case 60 and the disk-shaped cushion element 34. For example, the fluid (e.g., pressurized air) may be delivered from the circular cavity 23 to a chamber 93 along a backside of the valve chest 62 via the orifices 89. The chamber 93 is defined between the backside of the valve chest 62, a backside or tapered side 95 of the valve case 60, and the disk-shaped cushion element 34. The tapered side 95 of the valve case 60 may define openings where the fluid (e.g., pressurized air) is then delivered to the bore 13 along the proximal region 15. Alternately, the fluid (e.g., pressurized air) may be delivered to the bore 13 along the proximal region 15 via the gap defined along the region of contact between the valve case 60 and the disk-shaped cushion element 34. This may include deflecting the disk-shaped cushion element 34 to open the gap along the region of contact between the valve case 60 and the disk-shaped cushion element 34. The region of contact between the valve case 60 and the disk-shaped cushion element 34 may more specifically be along the tapered side 95 of the valve case 60.

Referring again to the exploded view of FIG. 3, the conventional retainer assembly 16 includes upper and lower sleeves 92, 94 for constraining axial movement of the chisel C within in the barrel 12, and a retainer 96 fastened to the outer periphery of the barrel 12 with a retainer spring 98 to fix the upper and lower sleeves 92, 94 with respect to the barrel 12. In this conventional retainer design, an annular ring of compressive material 99 (also referred to as a bumper) is disposed between the lower sleeve 94 and the end of the retainer 96 to cushion the retainer 96 from movement of the lower sleeve 94 when the piston 17 drives the chisel C outward. On the other hand, the retainer assembly 16' is a new design having a quick release function whereby the operator can remove the chisel C' without having to remove the retainer assembly 16'; this new retainer assembly 16' is described below. With either retainer design, a piston retainer element 100 seated in the barrel 12 inboard of the retainer assembly 16/16' limits outward movement of the piston 17 in the event the air tool 10 is operated without the chisel C/C' being installed. Advantageously, the barrel 12 can be used with either the conventional retainer assembly 16 or the new quick release retainer assembly 16'. The retainer assembly 16/16' may ultimately be secured to the barrel 12 along the distal region 19 and may be operable to secure or couple the chisel C/C' to the barrel 12.

The quick release retainer assembly 16' includes a tapered lower sleeve 102 disposed in the barrel 12 for limiting inward movement of the chisel C', a stepped retainer 104 removably fastened to lower or outboard end of barrel 12 with a retainer spring 98, a stepped locking collar 106 that slides over the outboard end of stepped retainer 104, and a set of steel balls 108 held in the stepped retainer 104. A wave spring 110 disposed in a cavity 112 between the stepped retainer 104 and locking collar 106 biases the locking collar 106 inward against a shoulder 104*a* formed on the outer periphery of the stepped retainer 104. A washer 114 at the outboard end of the locking collar 106 closes the cavity 112, and a snap ring 116 fastened on the outboard end of the stepped retainer 104 limits outward movement of the washer 114. The retainer assembly 16' works with a modified chisel C' having a series of cylindrical axially-extending grooves 118 distributed about its outer periphery at a point outboard of the barrel 12, and the steel balls 108 seat in the grooves 118 to constrain axial movement of the chisel C' with respect to the stepped retainer 104 (and hence, the barrel 12). Each of the steel balls 108 is captured in a radial opening 120 formed in the stepped retainer 104 so as to permit radial but not axial movement of the balls 108 with respect to the stepped retainer 104. When the stepped locking collar 106 is in the normal position depicted in the figures, its inner periphery matches the outer periphery of the stepped retainer 104, holding the steel balls 108 in the grooves 118 of chisel C'. This constrains axial movement of the chisel C' with respect to the stepped retainer 104, as mentioned above. However, when the operator manually moves the locking collar 106 outward against the force of wave spring 110, the wave spring 110 compresses, and the enlarged diameter inner periphery 122 of the stepped locking collar 106 becomes axially aligned with the radial openings 120 in the stepped retainer 104. This allows the steel balls 108 to move radially outward to the point that they no longer are seated in the grooves 118, whereupon the chisel C' can be removed from the barrel 12.

The above-described design features significantly reduce the weight of a heavy-duty air tool without sacrificing its performance. The novel way that the barrel 12 is joined to the handle 14 is force isolating so that the handle body 14*a* can be constructed of aluminum instead of cast iron, and the compact arrangement of the throttle valve assembly 22 and control valve assembly 36 within the handle body 14*a* further compact the overall design. The novel and reduced weight barrel 12 can be used with either a conventional chisel C and retainer assembly 16, or the new chisel C' and quick release retainer assembly 16'. Obviously, our invention is not limited to the illustrated embodiments of these features, and it will be recognized that numerous modifications and variations will occur to those skilled in the art without departing from the intended scope of this invention.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A percussion tool comprising:

a barrel having a proximal region, having a distal region, and defining a bore extending from the proximal region to the distal region;

a chisel at least partially disposed within the bore along the distal region;

a piston disposed within the bore and operable to move within the bore between the proximal region and the distal region;

a handle secured to the barrel along the proximal region, defining a cavity positioned adjacent to an end of the bore, and defining at least one channel operable to supply pressurized air to the cavity, wherein the cavity is axially aligned with the bore such that the cavity is operable to receive an end portion of the piston when the piston moves into the proximal region of the bore; and a valve disposed within the cavity, the valve having, a first manifold operable to establish fluid communication between the cavity and the bore along the proximal region to drive the piston toward the distal region for engagement with the chisel, a second manifold operable to establish fluid communication between the cavity and the bore along the distal region to drive the piston toward the proximal region and away from the chisel, and an armature disposed between the first and second manifolds, operable to (i) engage the first manifold to restrict fluid communication between the cavity and the bore along the proximal region, (ii) disengage the first manifold to facilitate fluid communication between the cavity and the bore along the proximal region, (iii) engage the second manifold to restrict fluid communication between the cavity and the bore along the distal region, and (iv) disengage the second manifold to facilitate fluid communication between the cavity and the bore along the distal region; and a cushion disposed within the cavity such that the first manifold, the second manifold, and the armature are positioned between the cushion and the barrel, wherein the cushion is operable to absorb kinetic energy from the piston in response to the end portion of the piston (i) extending into the cavity, through central openings defined by the first manifold, the second manifold, and the armature, and (ii) engaging the cushion.

2. The percussion tool of claim 1, wherein the valve further comprises a valve case disposed within the cavity.

3. The percussion tool of claim 2, wherein the first manifold, the second manifold, and the armature are disposed annularly around the valve case.

4. The percussion tool of claim 1, wherein the barrel defines at least one channel that is disposed radially outward from the bore, and wherein the at least one channel is operable to establish fluid communication between the second manifold and the distal region of the bore.

5. The percussion tool of claim 4, wherein a central region of the barrel defines openings that are in fluid communication with the at least one channel, and wherein the openings are operable to deliver air from the bore to the valve via the at least one channel in response to the piston transitioning to the distal region to transition the armature toward engagement with the first manifold.

6. The percussion tool of claim 1, wherein the first and second manifolds define orifices that are operable to establish fluid communication between the first and second manifolds and the cavity to receive the pressurized air therefrom.

7. The percussion tool of claim 6, wherein the orifices defined by the first manifold are operable to deliver the pressurized air from the cavity to the bore along the proximal region.

8. The percussion tool of claim 6, wherein the orifices defined by the second manifold are operable to deliver the pressurized air from the cavity to the bore along the distal region.

9. The percussion tool of claim 1 further comprising a retainer secured to the barrel along the distal region and operable to secure the chisel to the barrel.

10. The percussion tool of claim 1, wherein the first manifold, the second manifold, and the armature define first, second, and third central openings, respectively, and further comprising a valve case disposed within the first, second, and third central openings and having an outer surface operable to engage an inner surface of the armature along the third central opening to guide the armature between the first and second manifolds.

11. The percussion tool of claim 10, wherein the valve case defines a fourth central opening that is axially aligned with the bore such that the fourth central opening is operable to receive the end portion of the piston when the piston moves into the proximal region of the bore.

12. The percussion tool of claim 1, wherein the barrel has a central region positioned between the proximal and distal regions, defines openings along the central region that extend radially outward from the bore, and further comprising an exhaust deflector positioned radially around the central region of the barrel and defining ports that are in fluid communication with the openings, wherein the ports are operable to receive air from the openings and exhaust the air to ambient surroundings.

13. A percussion tool comprising:

a barrel having a proximal region, having a distal region, and defining a bore extending from the proximal region to the distal region;

a tool bit at least partially disposed within the bore along the distal region;

a piston disposed within the bore and operable to move within the bore between the proximal region and the distal region;

a handle secured to the barrel along the proximal region, defining a cavity positioned adjacent to an end of the bore, and defining at least one channel operable to supply pressurized air to the cavity; and a valve disposed within the cavity, the valve having, a first manifold defining a first central opening and operable to establish fluid communication between the cavity and the bore along the proximal region to drive the piston toward the distal region for engagement with the tool bit, a second manifold defining a second central opening and operable to establish fluid communication between the cavity and the bore along the distal region to drive the piston toward the proximal region and away from the tool bit, and an armature defining a third central opening and disposed between the first and second manifolds, operable to (i) engage the first manifold to restrict fluid communication between the cavity and the bore along the proximal region, (ii) disengage the first manifold to facilitate fluid communication between the cavity and the bore along the proximal region, (iii) engage the second manifold to restrict fluid communication between the cavity and the bore along the distal region, and (iv) disengage the second manifold to facilitate fluid communication between the cavity and the bore along the distal region; and a valve case disposed within the first, second, and third central openings and having an outer surface operable to engage an inner surface of the armature along the third central opening to guide the armature between the first and second manifolds.

14. The percussion tool of claim 13, wherein the valve case defines a fourth central opening that is axially aligned with the bore such that the fourth central opening is operable to receive an end portion of the piston when the piston moves into the proximal region of the bore.

15. The percussion tool of claim 13, wherein the cavity is axially aligned with the bore such that the cavity is operable to receive an end portion of the piston when the piston moves into the proximal region of the bore, and further comprising a cushion disposed within the cavity such that the first manifold, second manifold, and armature are positioned between the cushion and the barrel, wherein the cushion is operable to absorb kinetic energy from the piston in response to the end portion of the piston (i) extending into the cavity, through the first central opening, the second central opening, and the third central opening, and (ii) engaging the cushion.

16. The percussion tool of claim 13, wherein the barrel has a central region positioned between the proximal and distal regions, defines openings along the central region that extend radially outward from the bore, and further comprising an exhaust deflector positioned radially around the central region of the barrel and defining ports that are in fluid communication with the openings, wherein the ports are operable to receive air from the openings and exhaust the air to ambient surroundings.

17. A percussion tool comprising:

a barrel having a proximal region, having a distal region, having a central region positioned between the proximal and distal regions, defining a bore extending from the proximal region to the distal region, and defining openings along the central region that extend radially outward from the bore;

a tool bit at least partially disposed within the bore along the distal region;

a piston disposed within the bore and operable to move within the bore between the proximal region and the distal region;

a handle secured to the barrel along the proximal region, defining a cavity positioned adjacent to an end of the bore, and defining at least one channel operable to supply pressurized air to the cavity;

a valve disposed within the cavity, the valve having, a first manifold operable to establish fluid communication between the cavity and the bore along the proximal region to drive the piston toward the distal region for engagement with the tool bit, a second manifold operable to establish fluid communication between the cavity and the bore along the distal region to drive the piston toward the proximal region and away from the tool bit, and an armature disposed between the first and second manifolds, operable to (i) engage the first manifold to restrict fluid communication between the cavity and the bore along the proximal region, (ii) disengage the first manifold to facilitate fluid communication between the cavity and the bore along the proximal region, (iii) engage the second manifold to restrict fluid communication between the cavity and the bore along the distal region, and (iv) disengage the second manifold to facilitate fluid communication between the cavity and the bore along the distal region; and an exhaust deflector positioned radially around the central region of the barrel and defining ports that are in fluid communication with the openings, wherein the ports are operable to receive air from the openings and exhaust the air to ambient surroundings.

18. The percussion tool of claim 17, wherein the cavity is axially aligned with the bore such that the cavity is operable to receive an end portion of the piston when the piston moves into the proximal region of the bore, and further comprising a cushion disposed within the cavity such that the first manifold, second manifold, and armature are positioned between the cushion and the barrel, wherein the cushion is operable to absorb kinetic energy from the piston in response to the end portion of the piston (i) extending into the cavity, through central openings defined by the first manifold, the second manifold, and the armature, and (ii) engaging the cushion.

19. The percussion tool of claim 17, wherein the first manifold, the second manifold, and the armature define first, second, and third central openings, respectively, and further comprising a valve case disposed within the first, second, and third central openings and having an outer surface operable to engage an inner surface of the armature along the third central opening to guide the armature between the first and second manifolds.

20. The percussion tool of claim 19, wherein the valve case defines a fourth central opening that is axially aligned with the bore such that the fourth central opening is operable to receive an end portion of the piston when the piston moves into the proximal region of the bore.

* * * * *